(12) United States Patent
Wang et al.

(10) Patent No.: US 11,619,379 B2
(45) Date of Patent: Apr. 4, 2023

(54) SOLAR THERMODYNAMIC POWER GENERATOR

(71) Applicant: Haibiao Wang, Shanghai (CN)

(72) Inventors: Haibiao Wang, Shanghai (CN); Xuantong Zhu, Dalian (CN); Huitong Ma, Daqing (CN); Shenghan Gao, Zhongshan (CN); Sheng Ren, Dalian (CN); Jimmy Y Wang, Hillsborough, CA (US); Benjamin Hock Beng Khoo, Singapore (SG)

(73) Assignee: REGEN TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 17/889,133

(22) Filed: Aug. 16, 2022

(65) Prior Publication Data

US 2022/0390099 A1    Dec. 8, 2022

(51) Int. Cl.
*F22B 1/00* (2006.01)
*F22B 37/04* (2006.01)
(Continued)

(52) U.S. Cl.
CPC .............. *F22B 1/006* (2013.01); *F03G 6/005* (2013.01); *F03G 6/108* (2021.08); *F22B 1/003* (2013.01); *F22B 1/1807* (2013.01); *F22B 37/04* (2013.01)

(58) Field of Classification Search
CPC ........ F22B 1/006; F22B 1/003; F22B 1/1807; F22B 37/04; F03G 6/005; F03G 6/108
(Continued)

(56) References Cited

U.S. PATENT DOCUMENTS

| 5,128,115 A | * | 7/1992 | Glatzmaier | ............ B01J 19/127 |
| | | | | 23/295 S |
| 8,955,320 B2 | * | 2/2015 | Xiang | ...................... F01K 3/00 |
| | | | | 60/659 |

(Continued)

FOREIGN PATENT DOCUMENTS

| CN | 101307751 A | * | 11/2008 | |
| CN | 103502639 A | * | 1/2014 | ............. F01K 13/02 |

(Continued)

OTHER PUBLICATIONS

Translations (or Engligh Abstracts) of the seven foreign patent documents above.*

(Continued)

*Primary Examiner* — Mickey H France

(57) ABSTRACT

A solar thermodynamic power generator includes: a quartz window placed on a metal shell to form an electromagnetic resonant cavity structure for receiving solar energy; a ceramic conduit placed in the metal shell, wherein a working medium is heated in the ceramic conduit by the solar energy; a heat exchanger placed in a vacuum insulation oil tank; a steam generator placed in the vacuum insulation oil tank; a ceramic heating tube placed in a combustion chamber; and a turbine communicating with the steam generator through a fifth pipeline and a sixth pipeline. The present invention is environmentally friendly, safe, low-cost, high-efficiency, pollution-free, emission-free, and not affected by natural weather or environment. Like natural gas, the present invention can be configured to perform grid-connected power generation. Furthermore, after the hydrogen fuel and the hydrogen silicon fuel are mixed and burned, waste hydrogen can be recycled and reused.

16 Claims, 1 Drawing Sheet

(51) Int. Cl.
  *F22B 1/18* (2006.01)
  *F03G 6/00* (2006.01)
(58) Field of Classification Search
  USPC .............................. 60/641.8, 641.11, 641.15
  See application file for complete search history.

(56) References Cited

U.S. PATENT DOCUMENTS

| | | | | |
|---|---|---|---|---|
| 2005/0183421 | A1* | 8/2005 | Vaynberg | F01K 25/08 60/641.8 |
| 2006/0266039 | A1* | 11/2006 | Skowronski | F03G 6/005 60/641.8 |
| 2008/0276616 | A1* | 11/2008 | Flynn | F28D 20/021 126/400 |
| 2013/0042857 | A1* | 2/2013 | Magaldi | F24S 20/20 126/714 |
| 2014/0026570 | A1* | 1/2014 | Wang | F03G 6/067 60/641.8 |
| 2015/0128595 | A1* | 5/2015 | Iaquaniello | F22B 1/006 60/659 |
| 2015/0167648 | A1* | 6/2015 | Bergan | F24S 23/00 60/641.15 |
| 2017/0030264 | A1* | 2/2017 | Chen | F01D 15/10 |
| 2018/0239121 | A1* | 8/2018 | Esteves Palmeira | G02B 27/30 |
| 2020/0011208 | A1* | 1/2020 | Pranov | F28D 20/023 |

FOREIGN PATENT DOCUMENTS

| | | | | | |
|---|---|---|---|---|---|
| CN | 105888996 | A | * | 8/2016 | |
| CN | 106822927 | A | * | 6/2017 | |
| CN | 112012895 | A | * | 12/2020 | |
| CN | 112146289 | A | * | 12/2020 | |
| CN | 215571323 | U | * | 1/2022 | |
| CN | 114076416 | A | * | 2/2022 | |
| JP | 2013242070 | A | * | 12/2013 | ............. F22B 1/006 |
| JP | 2014092086 | A | * | 5/2014 | |

OTHER PUBLICATIONS

Translations (or Engligh Abstracts) of the three foreign patent documents above.*

* cited by examiner

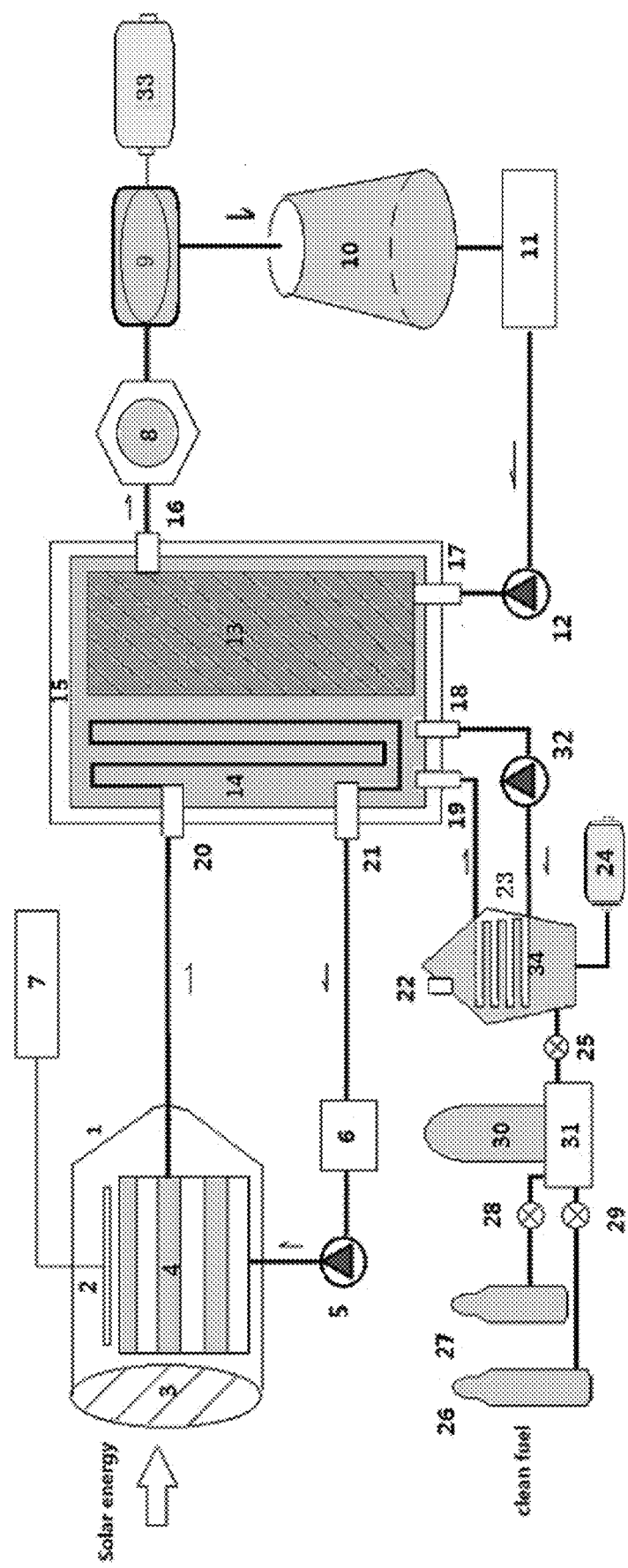

SOLAR THERMODYNAMIC POWER GENERATOR

BACKGROUND OF THE PRESENT INVENTION

Field of Invention

The present invention relates to a technical field of solar power generation, and more particularly to a solar thermodynamic power generator.

Description of Related Arts

Conventional solar power generation usually adopts large photovoltaic cell devices. Such devices cover a large area and are easily affected by the environment and weather, causing pollution or damage to the surface of the cells. As a result, power operation costs a lot and the service life is limited.

Therefore, there is an urgent need for a novel solar thermodynamic device which, like natural gas power generation, will not be affected by climate and weather, so as to form a high-efficiency and energy-saving power generation system that combines solar energy and hydrogen energy.

SUMMARY OF THE PRESENT INVENTION

An object of the present invention is to provide a renewable clean energy technology. Such technology combines solar energy and hydrogen energy to form a novel solar thermodynamic power generator, which can greatly reduce the consumption of hydrogen fuel and greatly improve the solar power generation efficiency.

Accordingly, in order to accomplish the above objects, the present invention provides a solar thermodynamic power generator, comprising:

a quartz window placed on a metal shell to form an electromagnetic resonant cavity structure for receiving solar energy;

a ceramic conduit placed in the metal shell; wherein a working medium is heated in the ceramic conduit by the solar energy;

a heat exchanger placed in a vacuum insulation oil tank; wherein the heat exchanger communicates with the ceramic conduit through a first pipeline and a second pipeline; the working medium flows into the heat exchanger through the first pipeline, and flows back to the ceramic conduit from the second pipeline, so as to transfer thermal energy from the ceramic conduit to the heat exchanger;

a steam generator placed in the vacuum insulation oil tank; wherein the steam generator is heated by the heat exchanger to generate steam;

a ceramic heating tube placed in a combustion chamber; wherein the combustion chamber heats the ceramic heating tube through combustion; the ceramic heating tube communicates with the vacuum insulation oil tank through a third pipeline and a fourth pipeline; oil in the vacuum insulation oil tank flows into the ceramic heating tube through the third pipeline, and flows back to the vacuum insulation oil tank through the fourth pipeline after being heated, thereby maintaining a temperature in the vacuum insulation oil tank within a preset range; and a turbine communicating with the steam generator through a fifth pipeline and a sixth pipeline; wherein the steam flows into the turbine through the fifth pipeline, and flows back to the steam generator through the sixth pipeline to drive the turbine; the turbine further drives a turbine generator to generate electricity.

Preferably, a resonant cavity electrode is also placed in the metal shell; the resonant cavity electrode is connected to an electromagnetic wave transmitter to emit electromagnetic waves in the electromagnetic resonant cavity structure.

Preferably, the first pipeline extends into the vacuum insulation oil tank through a first sealing port; the second pipeline extends into the vacuum insulation oil tank through a second sealing port; the third pipeline extends into the vacuum insulation oil tank through a third sealing port; the fourth pipeline extends into the vacuum insulation oil tank through a fourth sealing port; the fifth pipeline extends into the vacuum insulation oil tank through a fifth sealing port; the sixth pipeline extends into the vacuum insulation tank through a sixth sealing port.

Preferably, a working medium storage tank and a first circulating pump are arranged on the second pipeline in sequence; a second circulating pump is arranged on the third pipeline; a pressure booster is arranged on the fifth pipeline; a cooling tower, a storage tank and a third circulation pump are arranged on the sixth pipeline in sequence.

Preferably, the combustion chamber is equipped with an exhaust valve; the combustion chamber is connected to an internal combustion generator to generate electricity through combustion.

Preferably, a first fuel tank sends a first fuel into a gas flow valve automatic control box through a first relief valve; a second fuel tank sends a second fuel into the gas flow valve automatic control box through a second relief valve; the gas flow valve automatic control box mixes the first fuel with the first fuel through a gas mixing chamber to form a mixed fuel; then the gas flow valve automatic control box sends the mixed fuel into the combustion chamber through a program-controlled ignition device for combustion.

Preferably, the first fuel is a hydrogen fuel, and the second fuel is a hydrogen silicon fuel.

Preferably, the preset range of the temperature in the vacuum insulation oil tank is 115-120° C.

Preferably, the steam generator comprises a porous graphene ceramic material and a copper conduit; a diameter of the porous graphene ceramic material is about 20 mm, and an internal pore size thereof is 2-3 mm.

Compared with conventional solar power generation, the present invention is environmentally friendly, safe, low-cost, high-efficiency, pollution-free, emission-free, and not affected by natural weather or environment. Like natural gas, the present invention can be configured to perform grid-connected power generation. Furthermore, after the hydrogen fuel and the hydrogen silicon fuel are mixed and burned, waste hydrogen can be recycled and reused, which greatly reduces the consumption of the hydrogen fuel. The present invention explores a novel and effective technical route to realize the ideal development of new energy.

These and other objectives, features, and advantages of the present invention will become apparent from the following detailed description, the accompanying drawings, and the appended claims.

BRIEF DESCRIPTION OF THE DRAWINGS

FIGURE is a sketch view of a solar thermodynamic power generator according to a preferred embodiment of the present invention.

DETAILED DESCRIPTION OF THE PREFERRED EMBODIMENT

Referring to FIGURE, a solar thermodynamic power generator according to a preferred embodiment of the present invention is illustrated, comprising:

a quartz window 3 placed on a metal shell 1 to form an electromagnetic resonant cavity structure for receiving solar energy;

a ceramic conduit 4 placed in the metal shell 1; wherein a working medium is heated in the ceramic conduit by the solar energy;

a heat exchanger 14 placed in a vacuum insulation oil tank 15; wherein the heat exchanger 14 communicates with the ceramic conduit 4 through a first pipeline and a second pipeline; the working medium flows into the heat exchanger 14 through the first pipeline, and flows back to the ceramic conduit 4 from the second pipeline, so as to transfer thermal energy from the ceramic conduit 4 to the heat exchanger 14;

a steam generator 13 placed in the vacuum insulation oil tank 15; wherein the steam generator 13 is heated by the heat exchanger 14 to generate steam;

a ceramic heating tube 34 placed in a combustion chamber 23; wherein the combustion chamber 23 heats the ceramic heating tube 34 through combustion; the ceramic heating tube 34 communicates with the vacuum insulation oil tank 15 through a third pipeline and a fourth pipeline; oil in the vacuum insulation oil tank 15 flows into the ceramic heating tube 34 through the third pipeline, and flows back to the vacuum insulation oil tank 15 through the fourth pipeline after being heated, thereby maintaining a temperature in the vacuum insulation oil tank 15 within a preset range; and a turbine 9 communicating with the steam generator 13 through a fifth pipeline and a sixth pipeline; wherein the steam flows into the turbine 9 through the fifth pipeline, and flows back to the steam generator 13 through the sixth pipeline to drive the turbine 9; the turbine 9 further drives a turbine generator 33 to generate electricity.

According to the present invention, a specially designed electromagnetic wave resonant cavity is used to absorb solar energy. Based on the molecular wave resonance effect, the energy absorption efficiency can be significantly enhanced. The enhanced thermal energy is transferred to the steam generator 13 in the vacuum insulation oil tank 15 through the heat exchanger 14, so that the working medium of the steam generator 13 generates high-pressure steam, thereby driving the turbine to generate electricity.

Specifically, a resonant cavity electrode 2 is also placed in the metal shell 1; the resonant cavity electrode 2 is connected to an electromagnetic wave transmitter 7 to emit electromagnetic waves in the electromagnetic resonant cavity structure.

The vacuum insulation oil tank 15 adopts a high-vacuum heat-insulation method, which uses high-strength materials as external protection. There are several sealing ports on the vacuum insulation oil tank 15 to communicate with each part of the system.

Specifically, the first pipeline extends into the vacuum insulation oil tank 15 through a first sealing port 20; the second pipeline extends into the vacuum insulation oil tank 15 through a second sealing port 21; the third pipeline extends into the vacuum insulation oil tank 15 through a third sealing port 18; the fourth pipeline extends into the vacuum insulation oil tank 15 through a fourth sealing port 19; the fifth pipeline extends into the vacuum insulation oil tank 15 through a fifth sealing port 16; the sixth pipeline extends into the vacuum insulation tank 15 through a sixth sealing port 17.

Specifically, a working medium storage tank 6 and a first circulating pump 5 are arranged on the second pipeline in sequence; a second circulating pump 32 is arranged on the third pipeline; a pressure booster 8 is arranged on the fifth pipeline; a cooling tower 10, a storage tank 11 and a third circulation pump 12 are arranged on the sixth pipeline in sequence.

Generally, an output power of the turbine 9 is proportional to a steam flow rate of the working medium, and a change of air pressure has little influence on the output power. Therefore, the present invention arranges the pressure booster 8 at a front end of the turbine to keep the steam pressure stable.

Specifically, the combustion chamber 23 is equipped with an exhaust valve 22; the combustion chamber 23 is connected to an internal combustion generator 24 to generate electricity through combustion.

Specifically, a first fuel tank 26 sends a first fuel into a gas flow valve automatic control box 31 through a first relief valve 29; a second fuel tank 27 sends a second fuel into the gas flow valve automatic control box 31 through a second relief valve 28; the gas flow valve automatic control box 31 mixes the first fuel with the first fuel through a gas mixing chamber 30 to form a mixed fuel; then the gas flow valve automatic control box 31 sends the mixed fuel into the combustion chamber 23 through a program-controlled ignition device 25 for combustion.

Specifically, the first fuel is a hydrogen fuel, and the second fuel is a hydrogen silicon fuel.

Specifically, the preset range of the temperature in the vacuum insulation oil tank 15 is 115-120° C.

The hydrogen fuel (mixed hydrogen and hydrogen silicon fuel) can be used for auxiliary power generation through the internal combustion generator 24; or direct burned in the vacuum-enclosed combustion chamber 23 for rapidly heating the ceramic heating tube 34, in such a manner that the temperature of the vacuum insulation oil tank 15 is maintained at 115-120° C. With the continuously circulating working medium, critical supersaturated steam (working pressure generally exceeding 3.5 MPa) will be generated to drive the turbine 9 to generate electricity.

Specifically, the steam generator 13 comprises a porous graphene ceramic material and a copper conduit; a diameter of the porous graphene ceramic material is about 20 mm, and an internal pore size thereof is 2-3 mm.

The porous graphene ceramic material adopts a new carbon nano-sintering technology, which has excellent thermal conductivity, compression resistance, corrosion resistance, and no cracking. The internal porous distribution is uniform with a pore size of 2-3 mm, and the diameter is about 20 mm. Usually, multiple layers of the copper conduit should be provided in the vacuum insulation oil tank 15, which are connected to each other and are generally several tens of meters long (a volume must be greater than 1 cubic meter, and a certain flow rate can be maintained, i.e. above 1 cubic meter per second). All the copper conduits are immersed under the oil level.

Compared with conventional solar power generation, the present invention is environmentally friendly, safe, low-cost, high-efficiency, pollution-free, emission-free, and not affected by natural weather or environment. Like natural gas, the present invention can be configured to perform grid-connected power generation. Furthermore, after the hydrogen fuel and the hydrogen silicon fuel are mixed and burned, waste hydrogen can be recycled and reused, which greatly reduces the consumption of the hydrogen fuel. The present invention explores a novel and effective technical route to realize the ideal development of new energy.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A solar thermodynamic power generator, comprising:
    a quartz window (3) placed on a metal shell (1) to form an electromagnetic resonant cavity structure for receiving solar energy;
    a ceramic conduit (4) placed in the metal shell (1); wherein a working medium is heated in the ceramic conduit by the solar energy;
    a heat exchanger (14) placed in a vacuum insulation oil tank (15); wherein the heat exchanger (14) communicates with the ceramic conduit (4) through a first pipeline and a second pipeline; the working medium flows into the heat exchanger (14) through the first pipeline, and flows back to the ceramic conduit (4) from the second pipeline, so as to transfer thermal energy from the ceramic conduit (4) to the heat exchanger (14);
    a steam generator (13) placed in the vacuum insulation oil tank (15); wherein the steam generator (13) is heated by the heat exchanger (14) to generate steam;
    a ceramic heating tube (34) placed in a combustion chamber (23); wherein the combustion chamber (23) heats the ceramic heating tube (34) through combustion; the ceramic heating tube (34) communicates with the vacuum insulation oil tank (15) through a third pipeline and a fourth pipeline; oil in the vacuum insulation oil tank (15) flows into the ceramic heating tube (34) through the third pipeline, and flows back to the vacuum insulation oil tank (15) through the fourth pipeline after being heated, thereby maintaining a temperature in the vacuum insulation oil tank (15) within a preset range; and
    a turbine (9) communicating with the steam generator (13) through a fifth pipeline and a sixth pipeline; wherein the steam flows into the turbine (9) through the fifth pipeline, and flows back to the steam generator (13) through the sixth pipeline to drive the turbine (9); the turbine (9) further drives a turbine generator (33) to generate electricity.

2. The solar thermodynamic power generator, as recited in claim 1, wherein a resonant cavity electrode (2) is also placed in the metal shell (1); the resonant cavity electrode (2) is connected to an electromagnetic wave transmitter (7) to emit electromagnetic waves in the electromagnetic resonant cavity structure.

3. The solar thermodynamic power generator, as recited in claim 1, wherein the first pipeline extends into the vacuum insulation oil tank (15) through a first sealing port (20); the second pipeline extends into the vacuum insulation oil tank (15) through a second sealing port (21); the third pipeline extends into the vacuum insulation oil tank (15) through a third sealing port (18); the fourth pipeline extends into the vacuum insulation oil tank (15) through a fourth sealing port (19); the fifth pipeline extends into the vacuum insulation oil tank (15) through a fifth sealing port (16); the sixth pipeline extends into the vacuum insulation tank (15) through a sixth sealing port (17).

4. The solar thermodynamic power generator, as recited in claim 2, wherein the first pipeline extends into the vacuum insulation oil tank (15) through a first sealing port (20); the second pipeline extends into the vacuum insulation oil tank (15) through a second sealing port (21); the third pipeline extends into the vacuum insulation oil tank (15) through a third sealing port (18); the fourth pipeline extends into the vacuum insulation oil tank (15) through a fourth sealing port (19); the fifth pipeline extends into the vacuum insulation oil tank (15) through a fifth sealing port (16); the sixth pipeline extends into the vacuum insulation tank (15) through a sixth sealing port (17).

5. The solar thermodynamic power generator, as recited in claim 1, wherein a working medium storage tank (6) and a first circulating pump (5) are arranged on the second pipeline in sequence; a second circulating pump (32) is arranged on the third pipeline; a pressure booster (8) is arranged on the fifth pipeline; a cooling tower (10), a storage tank (11) and a third circulation pump (12) are arranged on the sixth pipeline in sequence.

6. The solar thermodynamic power generator, as recited in claim 4, wherein a working medium storage tank (6) and a first circulating pump (5) are arranged on the second pipeline in sequence; a second circulating pump (32) is arranged on the third pipeline; a pressure booster (8) is arranged on the fifth pipeline; a cooling tower (10), a storage tank (11) and a third circulation pump (12) are arranged on the sixth pipeline in sequence.

7. The solar thermodynamic power generator, as recited in claim 1, wherein the combustion chamber (23) is equipped with an exhaust valve (22); the combustion chamber (23) is connected to an internal combustion generator (24) to generate electricity through combustion.

8. The solar thermodynamic power generator, as recited in claim 6, wherein the combustion chamber (23) is equipped with an exhaust valve (22); the combustion chamber (23) is connected to an internal combustion generator (24) to generate electricity through combustion.

9. The solar thermodynamic power generator, as recited in claim 1, wherein a first fuel tank (26) sends a first fuel into a gas flow valve automatic control box (31) through a first relief valve (29); a second fuel tank (27) sends a second fuel into the gas flow valve automatic control box (31) through a second relief valve (28); the gas flow valve automatic control box (31) mixes the first fuel with the first fuel through a gas mixing chamber (30) to form a mixed fuel; then the gas flow valve automatic control box (31) sends the mixed fuel into the combustion chamber (23) through a program-controlled ignition device (25) for combustion.

10. The solar thermodynamic power generator, as recited in claim 8, wherein a first fuel tank (26) sends a first fuel into a gas flow valve automatic control box (31) through a first relief valve (29); a second fuel tank (27) sends a second fuel into the gas flow valve automatic control box (31) through a second relief valve (28); the gas flow valve automatic control box (31) mixes the first fuel with the first fuel through a gas mixing chamber (30) to form a mixed fuel; then the gas flow valve automatic control box (31) sends the mixed fuel into the combustion chamber (23) through a program-controlled ignition device (25) for combustion.

11. The solar thermodynamic power generator, as recited in claim 9, wherein the first fuel is a hydrogen fuel, and the second fuel is a hydrogen silicon fuel.

12. The solar thermodynamic power generator, as recited in claim 10, wherein the first fuel is a hydrogen fuel, and the second fuel is a hydrogen silicon fuel.

13. The solar thermodynamic power generator, as recited in claim 1, wherein the preset range of the temperature in the vacuum insulation oil tank (15) is 115-120° C.

14. The solar thermodynamic power generator, as recited in claim 12, wherein the preset range of the temperature in the vacuum insulation oil tank (15) is 115-120° C.

15. The solar thermodynamic power generator, as recited in claim 1, wherein the steam generator (13) comprises a porous graphene ceramic material and a copper conduit; a diameter of the porous graphene ceramic material is about 20 mm, and an internal pore size thereof is 2-3 mm.

16. The solar thermodynamic power generator, as recited in claim 14, wherein the steam generator (13) comprises a porous graphene ceramic material and a copper conduit; a diameter of the porous graphene ceramic material is about 20 mm, and an internal pore size thereof is 2-3 mm.

\* \* \* \* \*